(12) United States Patent
Zhao et al.

(10) Patent No.: US 11,039,175 B2
(45) Date of Patent: Jun. 15, 2021

(54) SYSTEMS AND METHODS FOR VARYING QUANTIZATION PARAMETERS

(71) Applicants: Sharp Kabushiki Kaisha, Sakai (JP); FG Innovation Company Limited, New Territories (HK)

(72) Inventors: Jie Zhao, Camas, WA (US); Seung-Hwan Kim, Camas, WA (US); Kiran Mukesh Misra, Camas, WA (US); Christopher Andrew Segall, Camas, WA (US)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/302,688

(22) PCT Filed: Apr. 27, 2017

(86) PCT No.: PCT/JP2017/016720
§ 371 (c)(1),
(2) Date: Nov. 19, 2018

(87) PCT Pub. No.: WO2017/203930
PCT Pub. Date: Nov. 30, 2017

(65) Prior Publication Data
US 2019/0124366 A1   Apr. 25, 2019

Related U.S. Application Data

(60) Provisional application No. 62/342,865, filed on May 27, 2016, provisional application No. 62/354,674, filed on Jun. 24, 2016.

(51) Int. Cl.
*H04N 19/96* (2014.01)
*H04N 19/176* (2014.01)
(Continued)

(52) U.S. Cl.
CPC .......... *H04N 19/96* (2014.11); *H04N 19/124* (2014.11); *H04N 19/126* (2014.11);
(Continued)

(58) Field of Classification Search
CPC .... H04N 19/96; H04N 19/126; H04N 19/463; H04N 19/124; H04N 19/61; H04N 19/176; H04N 19/186
See application file for complete search history.

(56) References Cited

U.S. PATENT DOCUMENTS 8,270,475 B2   9/2012   Sato et al.
2009/0296808 A1   12/2009   Regunathan et al.
(Continued)

FOREIGN PATENT DOCUMENTS

CN   1722832 A   1/2006
CN   103428497 A   12/2013
(Continued)

OTHER PUBLICATIONS

V. Sze, M. Budagavi, and G. J. Sullivan, "High efficiency video coding (HEVC):Algorithms and architectures," in Integrated Circuits and Systems. New York, NY, USA: Springer-Verlag, 2014, pp. 1-375 (Year: 2014).*

(Continued)

*Primary Examiner* — Richard A Hansell, Jr.
(74) *Attorney, Agent, or Firm* — Adeli LLP

(57) ABSTRACT

A video coding device may be configured to perform video coding according to one or more of the techniques described herein.

2 Claims, 13 Drawing Sheets

(51) Int. Cl.
*H04N 19/186* (2014.01)
*H04N 19/61* (2014.01)
*H04N 19/126* (2014.01)
*H04N 19/463* (2014.01)
*H04N 19/124* (2014.01)

(52) U.S. Cl.
CPC ......... *H04N 19/176* (2014.11); *H04N 19/186* (2014.11); *H04N 19/463* (2014.11); *H04N 19/61* (2014.11)

(56) References Cited

U.S. PATENT DOCUMENTS

| | | | |
|---|---|---|---|
| 2014/0079135 A1* | 3/2014 | Van der Auwera | H04N 19/463 375/240.18 |
| 2014/0104492 A1* | 4/2014 | Liu | H04N 5/38 348/387.1 |
| 2014/0286402 A1 | 9/2014 | Nishitani et al. | |
| 2014/0286403 A1* | 9/2014 | Nishitani | H04N 19/176 375/240.03 |
| 2015/0063460 A1* | 3/2015 | Gamei | H04N 19/124 375/240.18 |
| 2015/0071344 A1 | 3/2015 | Tourapis et al. | |
| 2015/0365671 A1* | 12/2015 | Pu | H04N 19/157 375/240.03 |
| 2015/0373327 A1* | 12/2015 | Zhang | H04N 19/157 375/240.03 |
| 2017/0208336 A1* | 7/2017 | Li | H04N 19/105 |
| 2017/0272759 A1* | 9/2017 | Seregin | H04N 19/61 |
| 2018/0020241 A1* | 1/2018 | Li | H04N 19/50 |
| 2018/0309992 A1* | 10/2018 | Lim | H04N 19/117 |
| 2019/0124367 A1* | 4/2019 | Lu | H04N 19/46 |

FOREIGN PATENT DOCUMENTS

| | | | |
|---|---|---|---|
| CN | 103975589 A | 8/2014 | |
| CN | 104303501 A | 1/2015 | |
| CN | 104427339 A | 3/2015 | |
| CN | 104737538 A | 6/2015 | |
| CN | 105359521 A | 2/2016 | |
| WO | 2009/158113 A2 | 12/2009 | |
| WO | 2015/035092 A2 | 3/2015 | |
| WO | WO-2015035092 A2 * | 3/2015 | ........... H04N 19/124 |

OTHER PUBLICATIONS

Official Communication issued in International Patent Application No. PCT/JP2017/016720, dated Aug. 1, 2017.
International Telecommunication Union, "Series H: Audiovisual and Multimedia Systems, Infrastructure of audiovisual services—Coding of moving video, High efficiency video coding", ITU-T H.265, Apr. 2015, 634 pages.
Chen et al., "Algorithm Description of Joint Exploration Test Model 2", Joint Video Exploration Team (JVET) of ITU-T SG 16 WP 3 and ISO/IEC JTC 1/SC 29/WG 11, JVET-B1001_v3, Feb. 20-26, 2016, 32 pages.
An et al., "Quadtree plus binary tree structure integration with JEM tools", Joint Video Exploration Team (JVET) of ITU-T SG 16 WP 3 and ISO/IEC JTC 1/SC 29/WG 11, JVET-B0023, Feb. 20-26, 2016, 11 pages.
Bross et al., "High Efficiency Video Coding (HEVC) text specification draft 9", Joint Collaborative Team on Video Coding (JCT-VC) of ITU-T SG16 WP3 and ISO/IEC JTC1/SC29/WG11, JCTVC-K1005_v1, Oct. 10-19, 2012, pp. 318.
Chen, J., et al., "Algorithm Description of Joint Exploration Test Model 2," JVET-B1001_v1, 2nd Meeting—JVET of ITU-T SG 16 WP 3 and ISO/IEC JTC 1/SC 29/WG 11, Feb. 20-26, 2016, 41 pages, San Diego, USA.
Flynn, David, et al., "High Efficiency Video Coding (HEVC) text specification draft 9", JCTVC-K1005_v1, 11th Meeting of Joint Collaborative Team on Video Coding (JCT-VC) of ITU-T SG16 WP3 and ISO/IEC JTC1/SC29/WG11, Oct. 10-19, 2012, 318 pages, Shanghai, China.

* cited by examiner

SYSTEMS AND METHODS FOR VARYING QUANTIZATION PARAMETERS

CROSS REFERENCE

This Nonprovisional application claims priority under 35 U.S.C. § 119 on provisional Application No. 62/354,674 on Jun. 24, 2016, and provisional Application No. 62/342,865 on May 27, 2016, the entire contents of which are hereby incorporated by reference.

TECHNICAL FIELD

This disclosure relates to video coding and more particularly to techniques for varying quantization parameters.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 2 (JEM 2), Algorithm Description of Joint Exploration Test Model 2 (JEM 2), ISO/IEC JTC1/SC29/WG11/N16066, February 2016, San Diego, Calif., US, which is incorporated by reference herein, describes the coding features that are under coordinated test model study by the JVET as potentially enhancing video coding technology beyond the capabilities of ITU-T H.265. It should be noted that the coding features of JEM 2 are implemented in JEM reference software maintained by the Fraunhofer research organization. Currently, the updated JEM reference software version 2 (JEM 2.0) is available. As used herein, the term JEM is used to collectively refer to algorithm descriptions of JEM 2 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for varying quantization parameters. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope to of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method of encoding video data, the method comprising: receiving transform coefficients corresponding to a chroma coding block, wherein the chroma coding block is independent of a luma component partition structure; determining quantization parameter for the chroma coding block; and generating level values based on the determined quantization parameter.

An aspect of the invention is a method of decoding video data, the method comprising: receiving level values corresponding to a chroma coding block, wherein the chroma coding block, is independent of a luma component partition structure; determining quantization parameter for the chroma coding block; and generating transform coefficient values based on the determined quantization parameter.

An aspect of the invention is a method of decoding video data, the method comprising: receiving level values corresponding to one or more coding blocks; determining one or more quantization groups for the one or more coding blocks; determining quantization parameter values for the one or more quantization groups; and generating transform coefficient values based on the determined quantization parameter values.

DESCRIPTION OF EMBODIMENTS

Video content typically includes video sequences comprised of a series of frames. A series of frames may also be referred to as a group of pictures (GOP). Each video frame or picture may include a plurality of slices or tiles, where a slice or tile includes a plurality of video blocks. As used herein, the term video block may generally refer to an area of a picture, including one or more components, or may more specifically refer to the largest array of pixel/sample values that may be predictively coded, sub-divisions thereof, and/or corresponding structures. Further, the term current video block may refer to an area of a picture being encoded or decoded. A video block may be defined as an array of pixel values (also referred to as samples) that may be predictively coded. Video blocks may be ordered according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. In ITU-T H.265, the CTBs of a CTU may be partitioned into Coding Blocks (CB) according to a corresponding quadtree block structure. According to ITU-T H.265, one luma CB together with two corresponding chroma CBs (e.g., Cr and Cb chroma components) and associated syntax elements are referred to as a coding unit (CU). In ITU-T H.265, a minimum allowed size of a CB may be signaled. In ITU-T H.265, the smallest minimum allowed size of a luma CB is 8×8 luma samples. A CU is associated with a prediction unit (PU) structure defining one or more prediction units (PU) for the CU, where a PU is associated with corresponding reference samples. That is, in ITU-T H.265, the decision to code a picture area using intra prediction or inter prediction is made at the CU level. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples.

Figure 3:
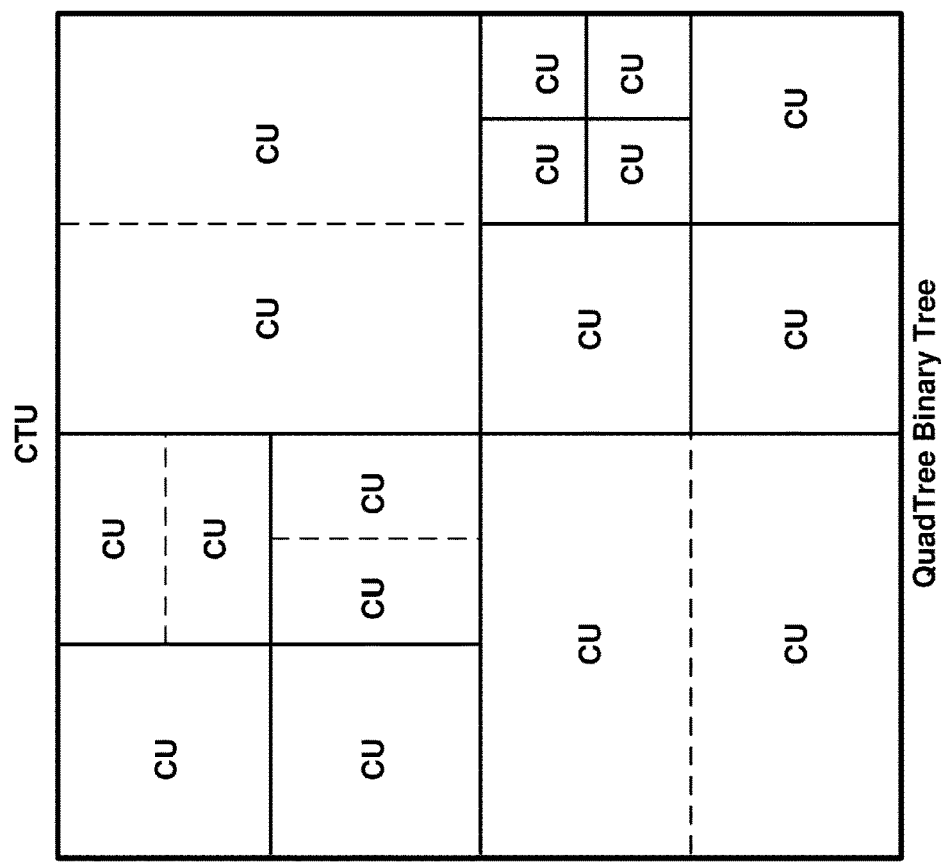
FIG. 3 is a conceptual diagram illustrating a quad tree binary tree partitioning in accordance with one or more techniques of this disclosure.
Figure 3:
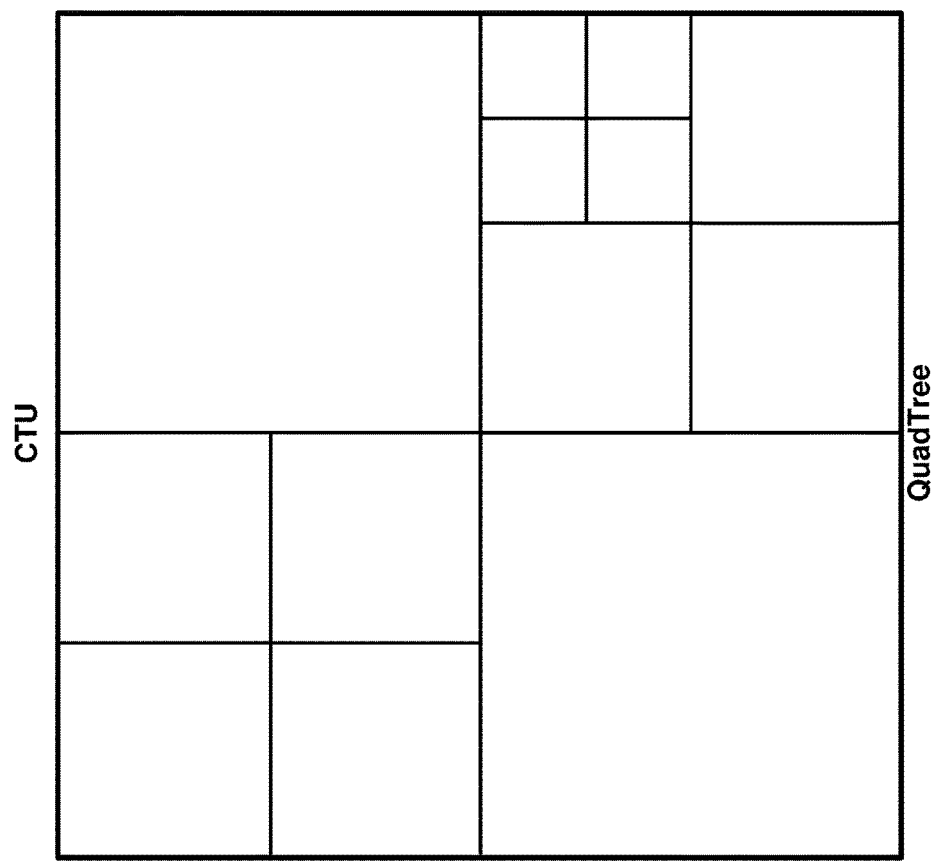
Figure 4:
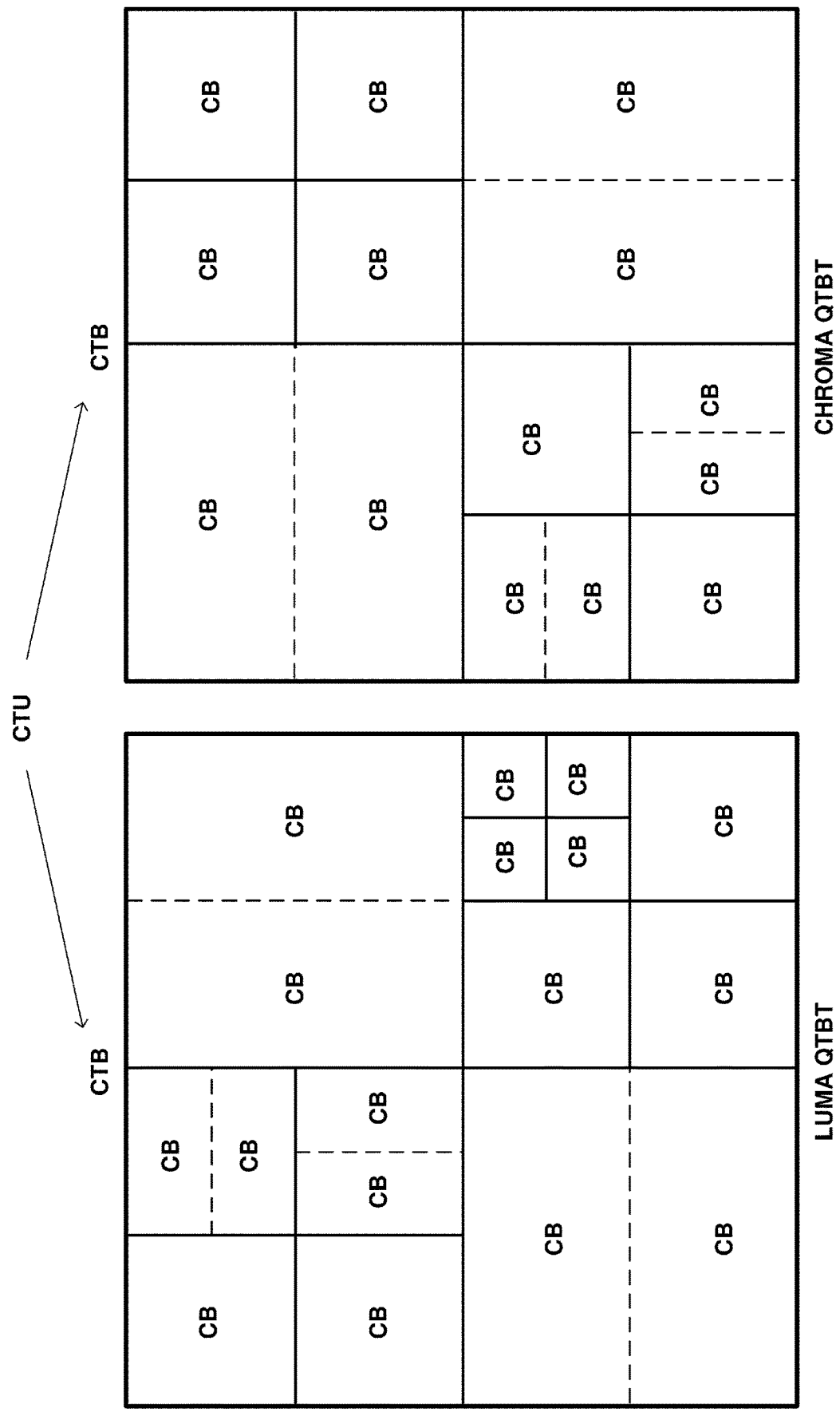
FIG. 4 is a conceptual diagram illustrating a quad tree binary tree partitioning in accordance with one or more techniques of this disclosure.
Figure 5A:
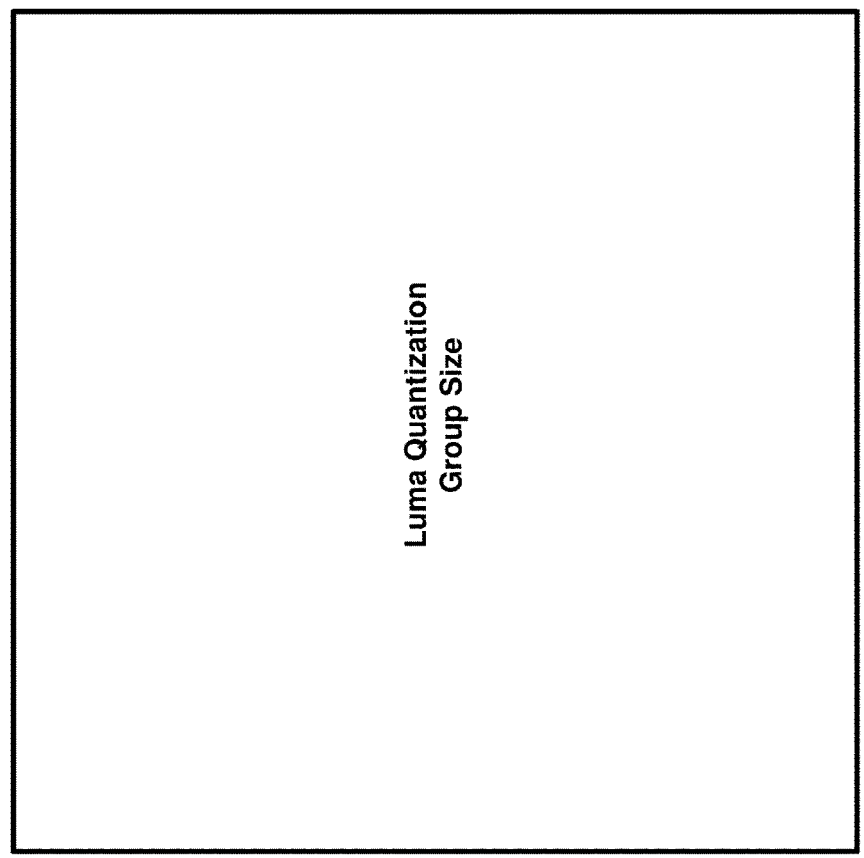
FIGS. 5A-5D are conceptual diagrams illustrating examples of varying component quantization parameters in accordance with one or more techniques of this disclosure.
Figure 5A:
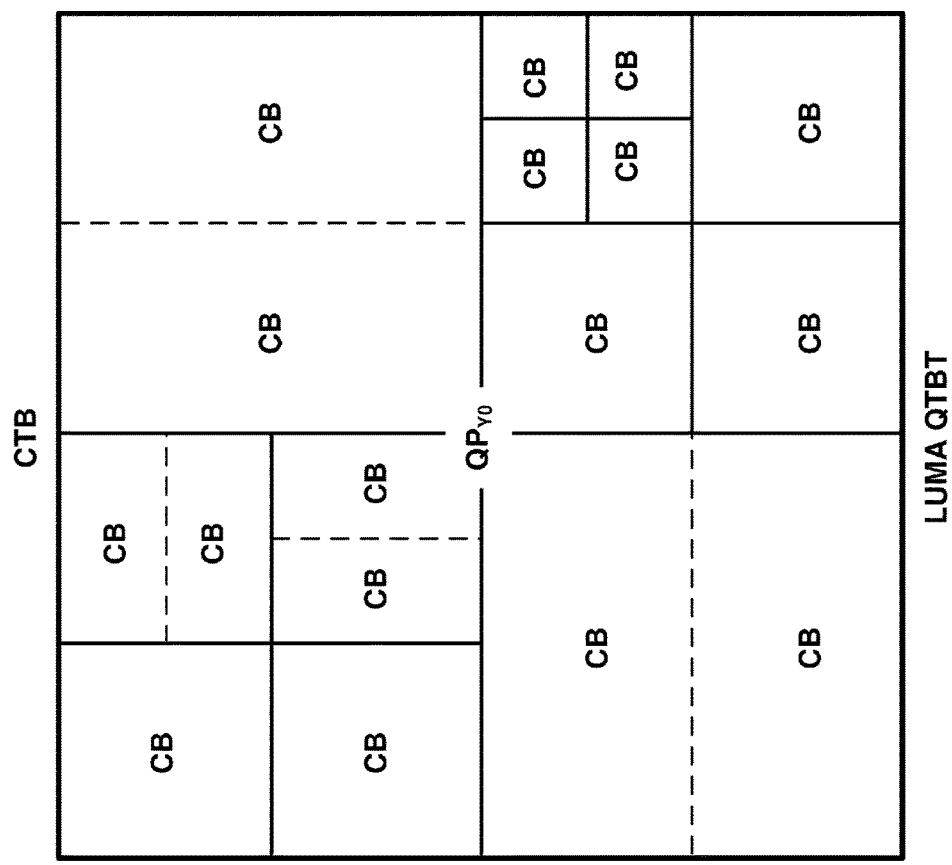
Figure 5B:
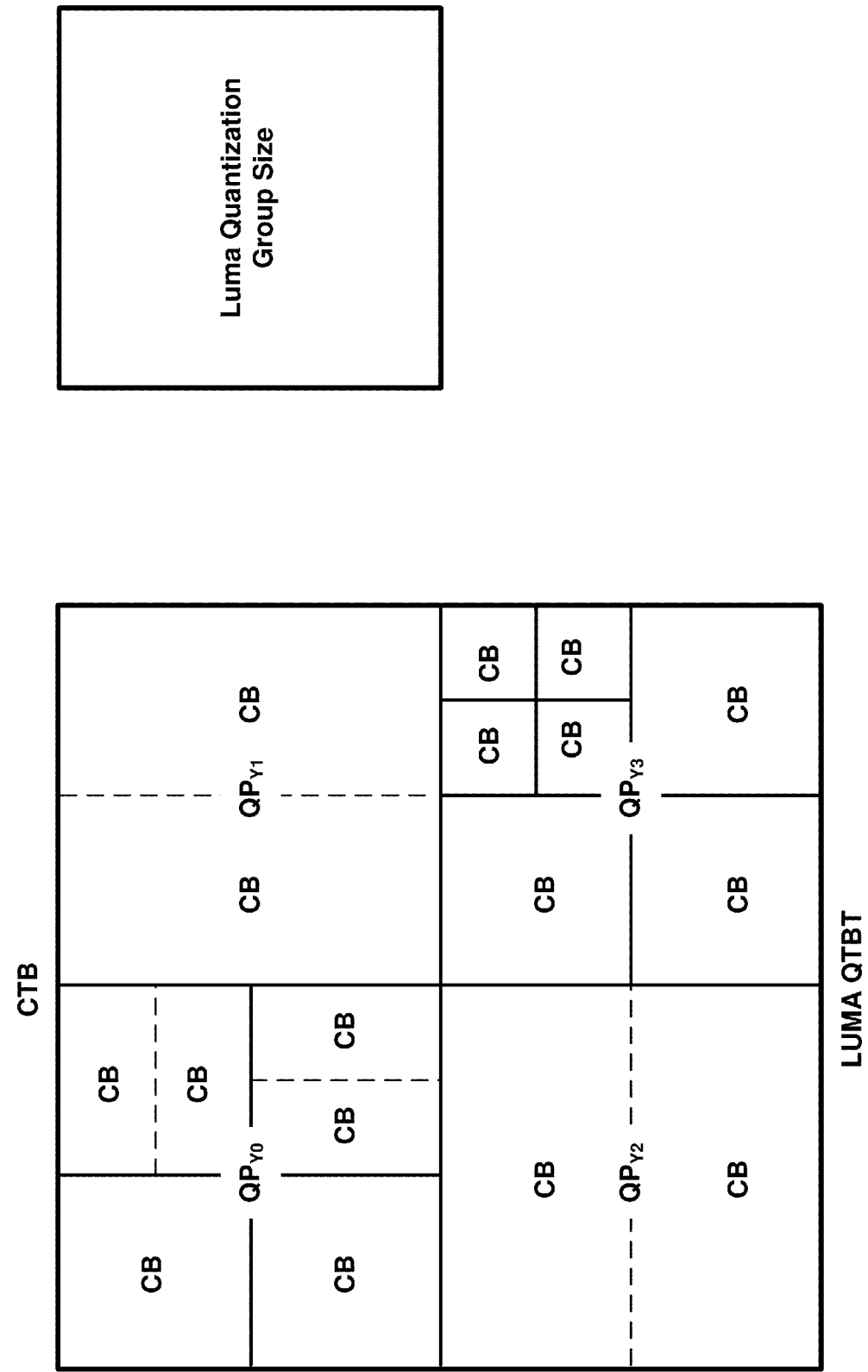
Figure 5C:
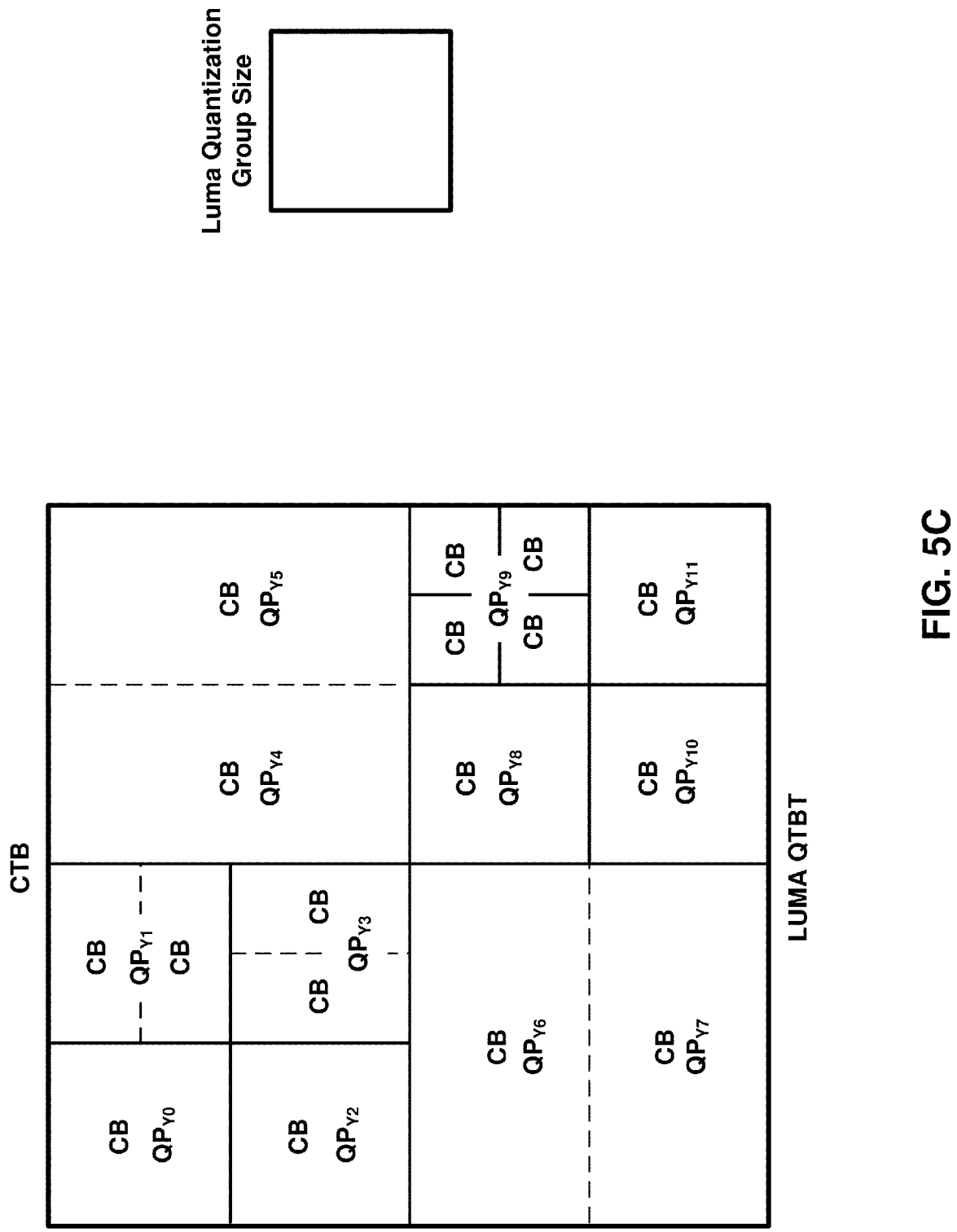
Figure 5D:
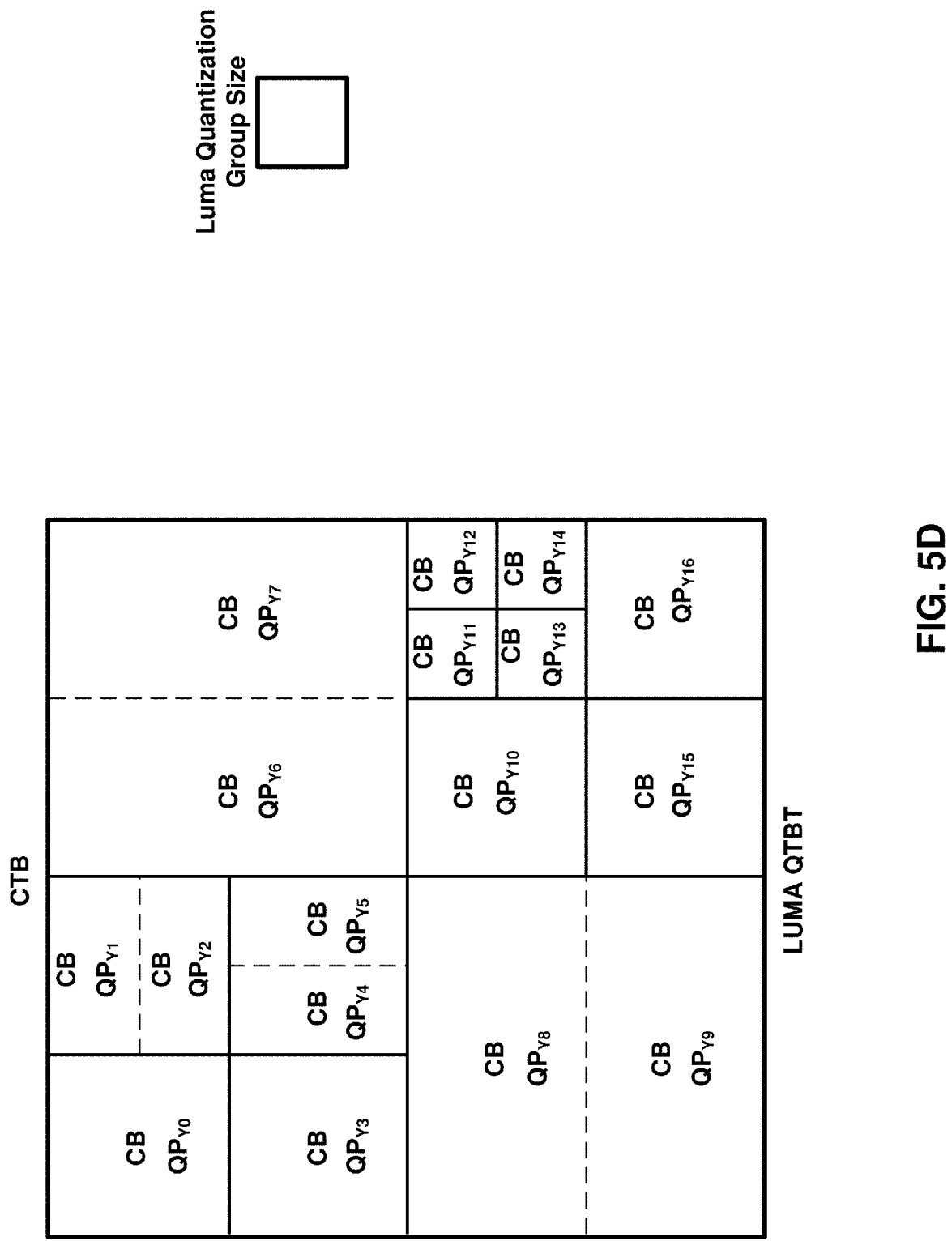
Figure 6A:
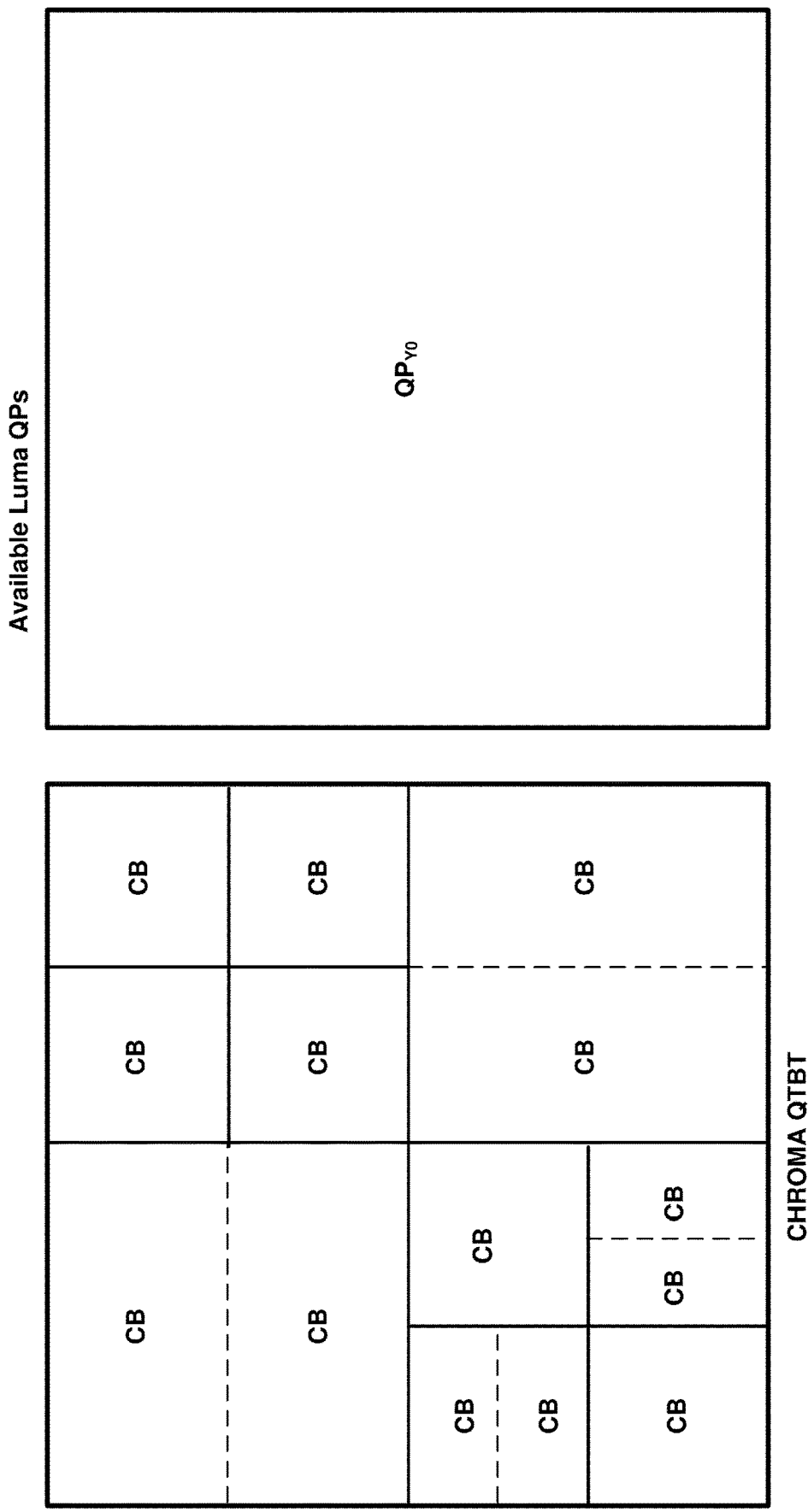
FIGS. 6A-6D are conceptual diagrams illustrating examples of component quantization parameters that may be available for determining quantization parameters for another component in accordance with one or more techniques of this disclosure.
Figure 6B:
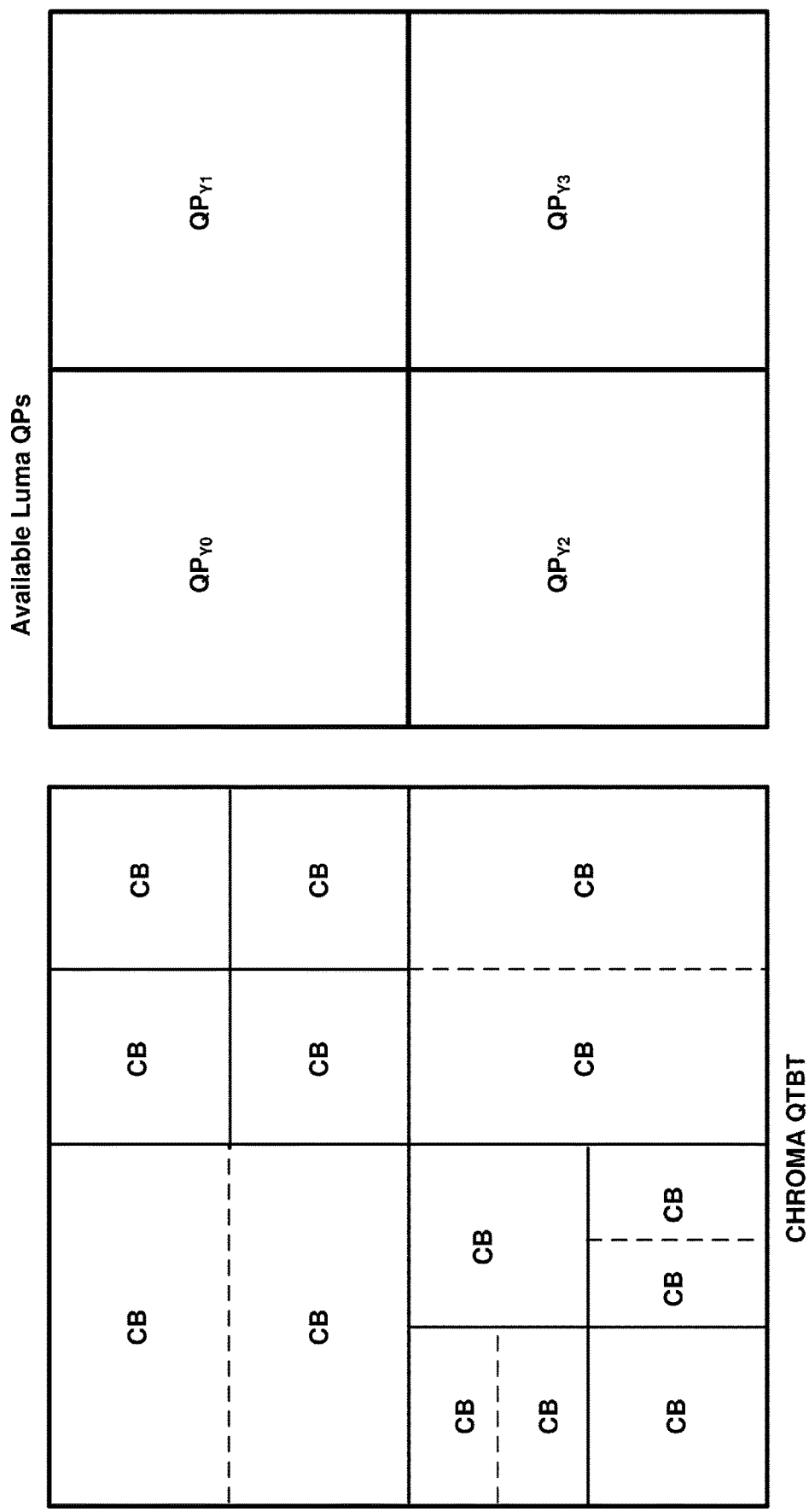
Figure 6C:
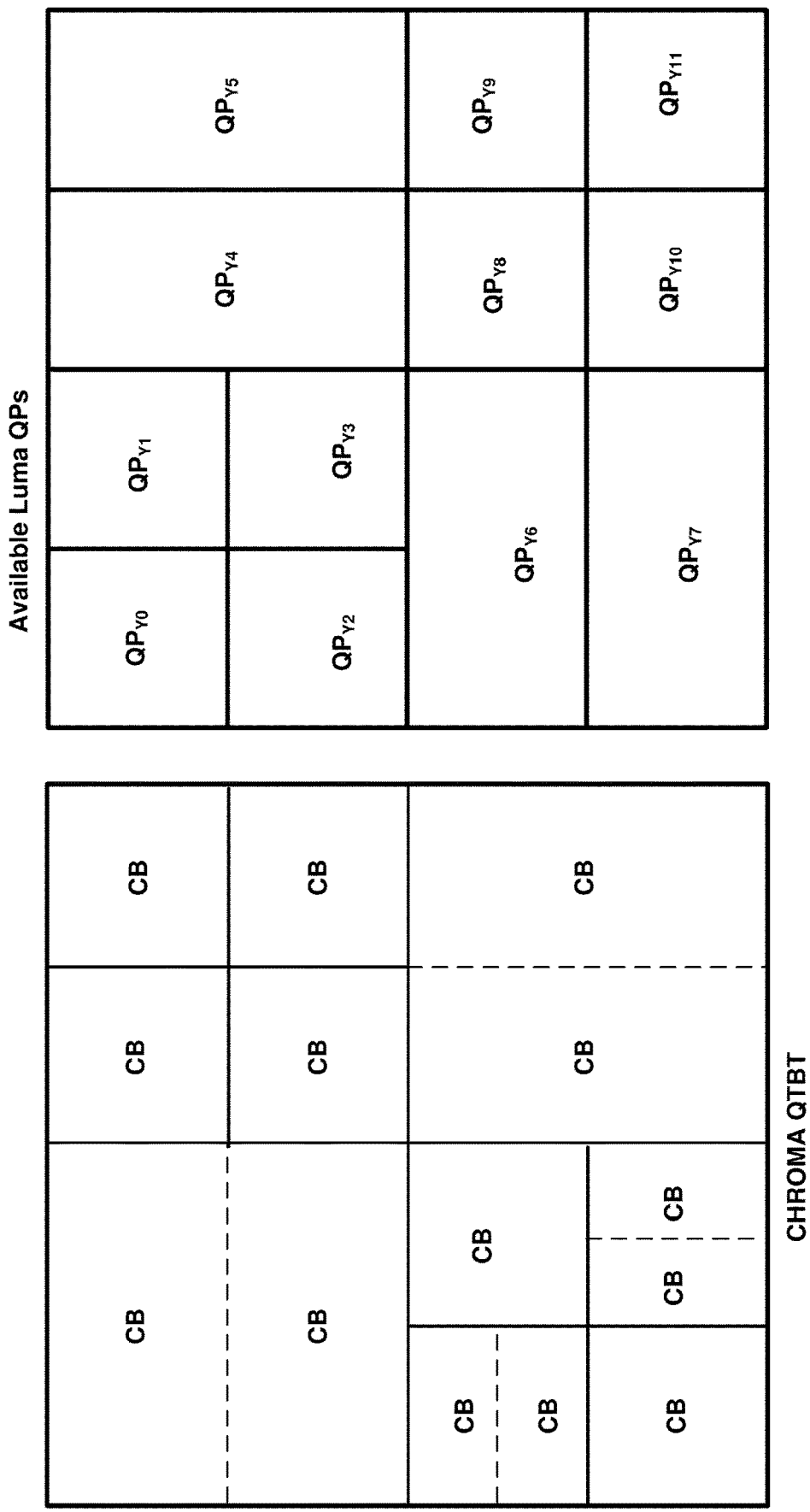
Figure 6D:
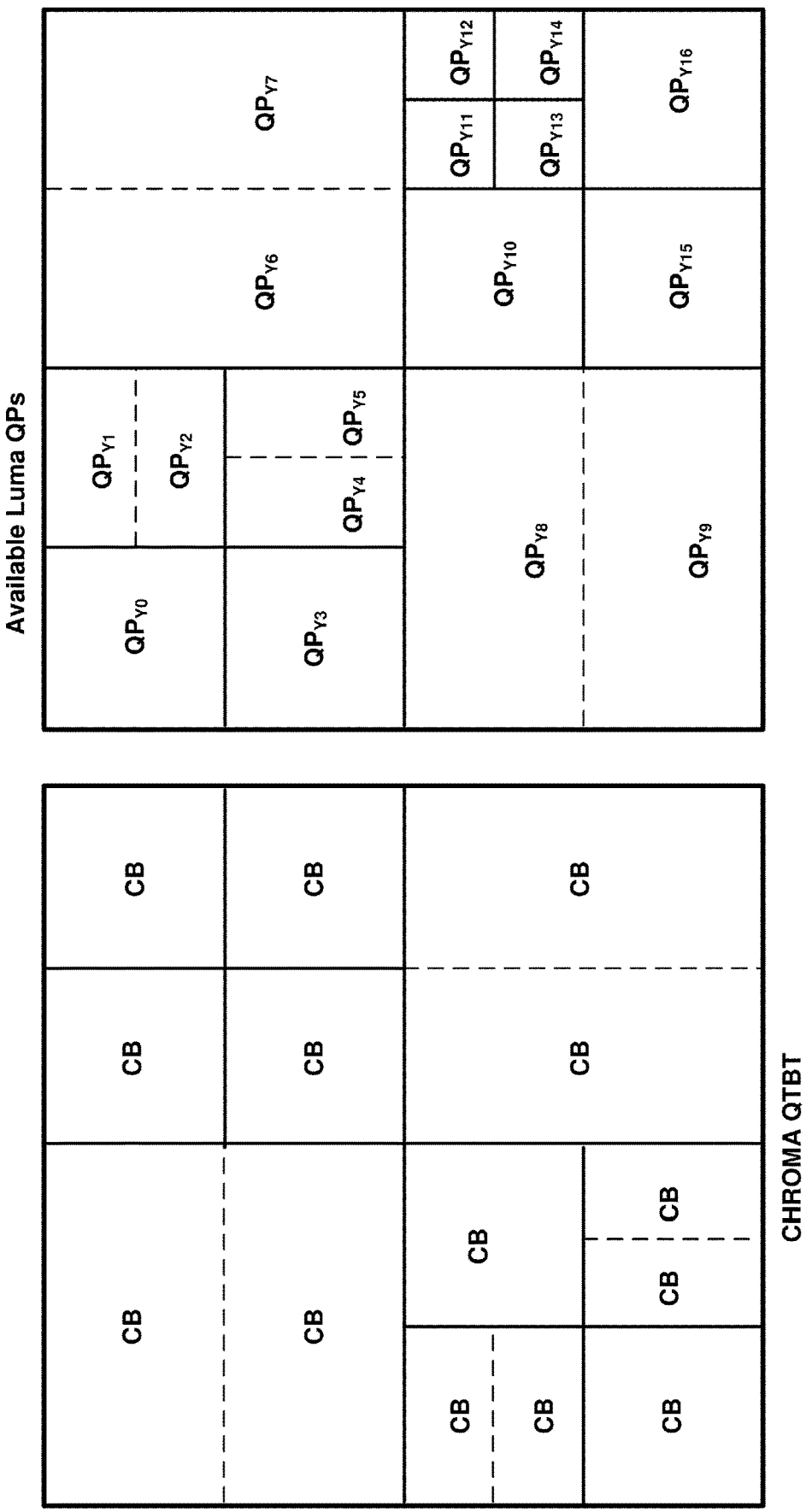

JEM specifies a CTU having a maximum size of 256×256 luma samples. In JEM, CTUs may be further partitioned according to a binary tree structure. That is, JEM specifies a quadtree plus binary tree (QTBT) block structure. In JEM, the QTBT structure enables quadtree leaf nodes to be further partitioned by a binary tree structure. In JEM, the binary tree structure enables quadtree leaf nodes to be divided vertically or horizontally. FIG. 3 illustrates an example of a CTU (e.g., a CTU having a size of 256×256 luma samples) being partitioned into quadtree leaf nodes and quadtree leaf nodes being further partitioned according to a binary tree. That is, in FIG. 3 dashed lines indicate binary tree partitions. Thus, the binary tree structure in JEM enables square and rectangular leaf nodes, where each leaf node includes a Coding Block (CB) for each component of video data. In JEM, CBs may be used for prediction without any further partitioning. Further, in JEM, luma and chroma components may have separate QTBT structures. That is, a chroma CB may be independent of a luma partition. Currently, in JEM separate QTBT structures are enabled for slices using intra prediction techniques. FIG. 4 illustrates an example of a CTU being partitioned according to a QTBT for a luma component and an independent QTBT for chroma components. As illustrated in FIG. 4, when independent QTBTs are used for partitioning a CTU, CBs of the luma component do not necessarily align with CBs of chroma components.

JEM includes the following parameters for signaling of a QTBT tree:

CTU size: the root node size of a quadtree (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur (e.g., 3);

MinBTSize: the minimum allowed binary tree leaf node size; i.e., the minimum width or height of a binary leaf node (e.g., 4 luma samples).

The difference between sample values included in a current CU, or another type of picture area structure, and associated reference samples (e.g., those generated using a prediction) may be referred to as residual data. Residual data may include respective arrays of difference values corresponding to each component of video data (e.g., luma (Y) and chroma (Cb and Cr). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, in ITU-T H.265, an array of pixel difference values may be sub-divided for purposes of generating transform coefficients (e.g., four 8×8 transforms may be applied to a 16×16 array of residual values), for each component of video data, such sub-divisions may be referred to as Transform Blocks (TBs). Currently in JEM, when a QTBT partitioning structure is used, residual values corresponding to a CB are used to generate transform coefficients without further partitioning. That is, in JEM a QTBT leaf node may be analogous to both a PB and TB in ITU-T H.265. Further, in JEM, a core transform and a subsequent secondary transforms may be applied (in the encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization scales transform coefficients in order to vary the amount of data required to send a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

In ITU-T H.265, the value of a quantization scaling factor, may be determined by a quantization parameter, QP. In ITU-T H.265, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a quantization parameter may be derived for each of luma (Y) and chroma (Cb and Cr) components.

In ITU-T H.265, for a current CU, a predictive QP value is inherited for the CU (i.e., a QP signaled at the slice level or a QP from a previous CU) and a delta QP value may be optionally signaled for each TU within the CU. For the luma component, the QP for each luma TB is the sum of the predictive QP value and any signaled delta QP value. In ITU-T H.265, a quantization group size is used to determine if a delta QP can be signaled for a particular TU. For example, an video encoder may select a CTU size of 64×64 and a quantization group size of 32×32. In this case, if the CTU is partitioned (using the quadtree structure provided in ITU-T H.265) into 32×32 TUs, then a delta QP may be signaled for each TU. However, if the 64×64 CTU is partitioned into 8×8 TUs, then a delta QP is only sent for the first 8×8 TU in each 32×32 region. Further, in ITU-T H.265, for the chroma components of the current CU, the chroma QP is a function of the QP determined for the luma component and chroma QP offsets signaled in a slice header and/or chroma QP offsets signaled a picture parameter set (PPS). It should be noted that in ITU-T H.265, the TU structure aligns TBs for each luma and chroma component. That is, in ITU-T H.265, a TB for a component (e.g., a chroma component) directly corresponds to a TB of another component. In an example, the size of a quantization group corresponds to the number of samples in the quantization group.

As described above, in ITU-T H.265, a picture may be split into CTUs of equal size and each CTU may include CTBs having 16×16, 32×32, or 64×64 luma samples and the minimum size of a luma CB may be 8×8 luma samples. In ITU-T H.265, a difference value is signaled in the PPS (i.e., syntax element diff_cu_qp_delta_depth) to indicate the difference between the luma CTB size and the quantization group size. For example, if the CTB size is 64×64 and the quantization group size is 16×16, a difference value (in logarithmic notation) is signaled to indicate the quantization group size. It should be noted that in ITU-T H.265, a quantization group is always square.

As described above, quantization may include division of transform coefficients by a quantization scaling factor and any associated rounding functions (e.g., rounding to the nearest integer). In some cases, quantization may result in level values of zero, e.g., for a relatively high quantization parameter. A non-zero level value may be described as significant. In ITU-T H.265, a coded block flag (cbf) may be signaled for each component to indicated whether a transform block includes one or more transform coefficient levels are not equal to 0 (e.g., coded block flags, cbf_luma, cbf_cb, and cbf_cr). In ITU-T H.265, the signaling of a delta QP value is conditioned on one of cbf_luma, cbf_cb, or cbf_cr indicating that one or more transform coefficient levels for a component are not equal to 0 (i.e., delta QP values are signaled when a TU includes significant level values).

Quantized transform coefficients and QP data (e.g., delta QP values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data may associate an area of a picture (e.g., a PU or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes. For inter prediction coding, a motion vector (MV) identifies reference samples in a picture other than the picture of a video block to be coded and thereby exploits temporal redundancy in video. For example, a current video block may be predicted from a reference block located in a previously coded frame and a motion vector may be used to indicate the location of the reference block. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, syntax elements may be entropy coded according to an entropy encoding technique. As described above, a binarization process may be performed on syntax elements as part of an entropy coding process. Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. After binarization, a CABAC entropy encoder may select a context model. For a particular bin, a context model may be selected from a set of available context models associated with the bin. In some examples, a context model may be selected based on a previous bin and/or values of previous syntax elements. For example, a context model may be selected based on the value of a neighboring intra prediction mode. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model. It should be noted that some syntax elements may be entropy encoded using arithmetic encoding without the usage of an explicitly assigned context model, such coding may be referred to as bypass coding.

Figure 1:
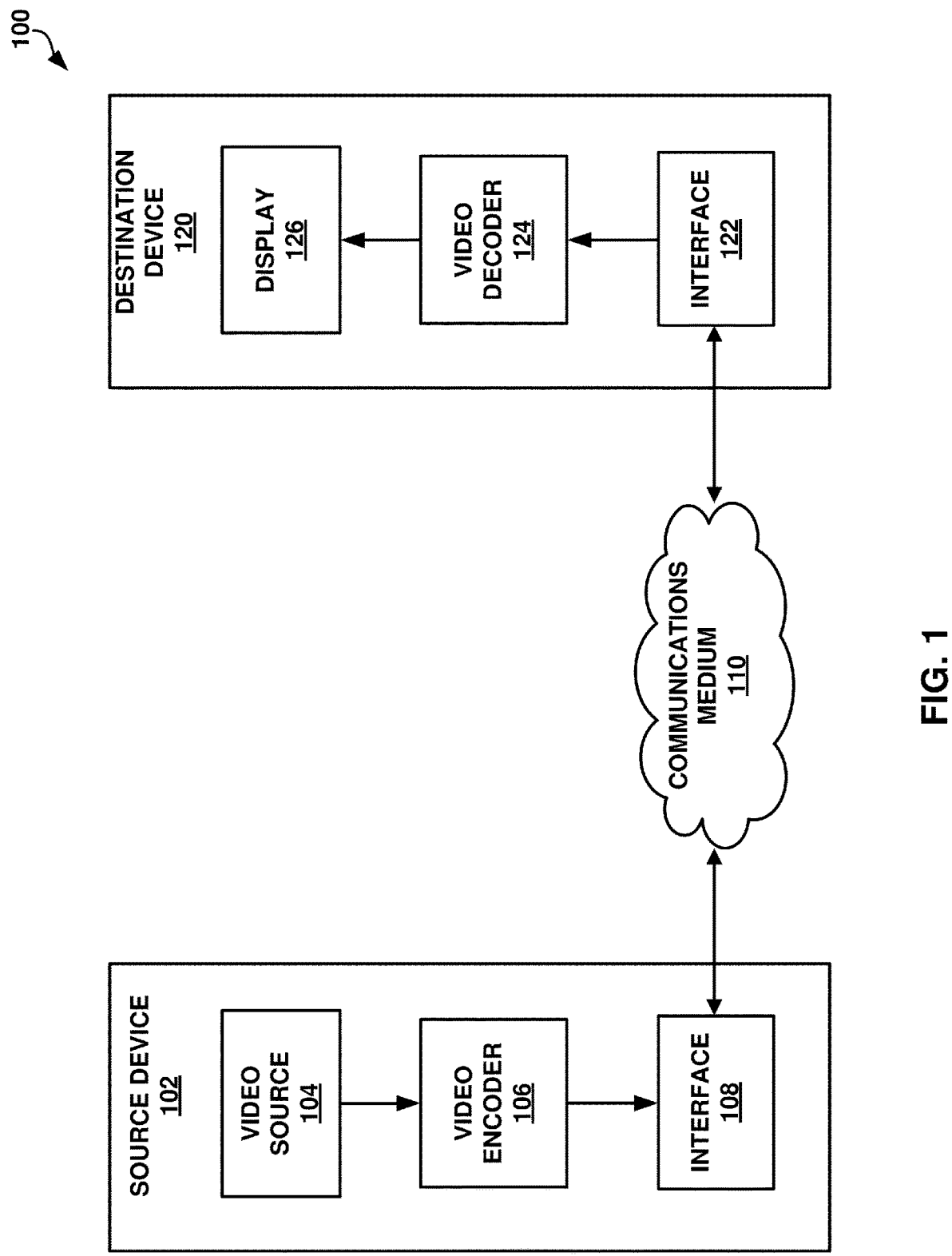
FIG. 1 is a block diagram illustrating an example of a system that may be configured to encode and decode video data according to one or more techniques of this disclosure.

FIG. 1 is a block diagram illustrating an example of a system that may be configured to code (i.e., encode and/or decode) video data according to one or more techniques of this disclosure. System 100 represents an example of a system that may derive cross-component prediction parameters according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 2:
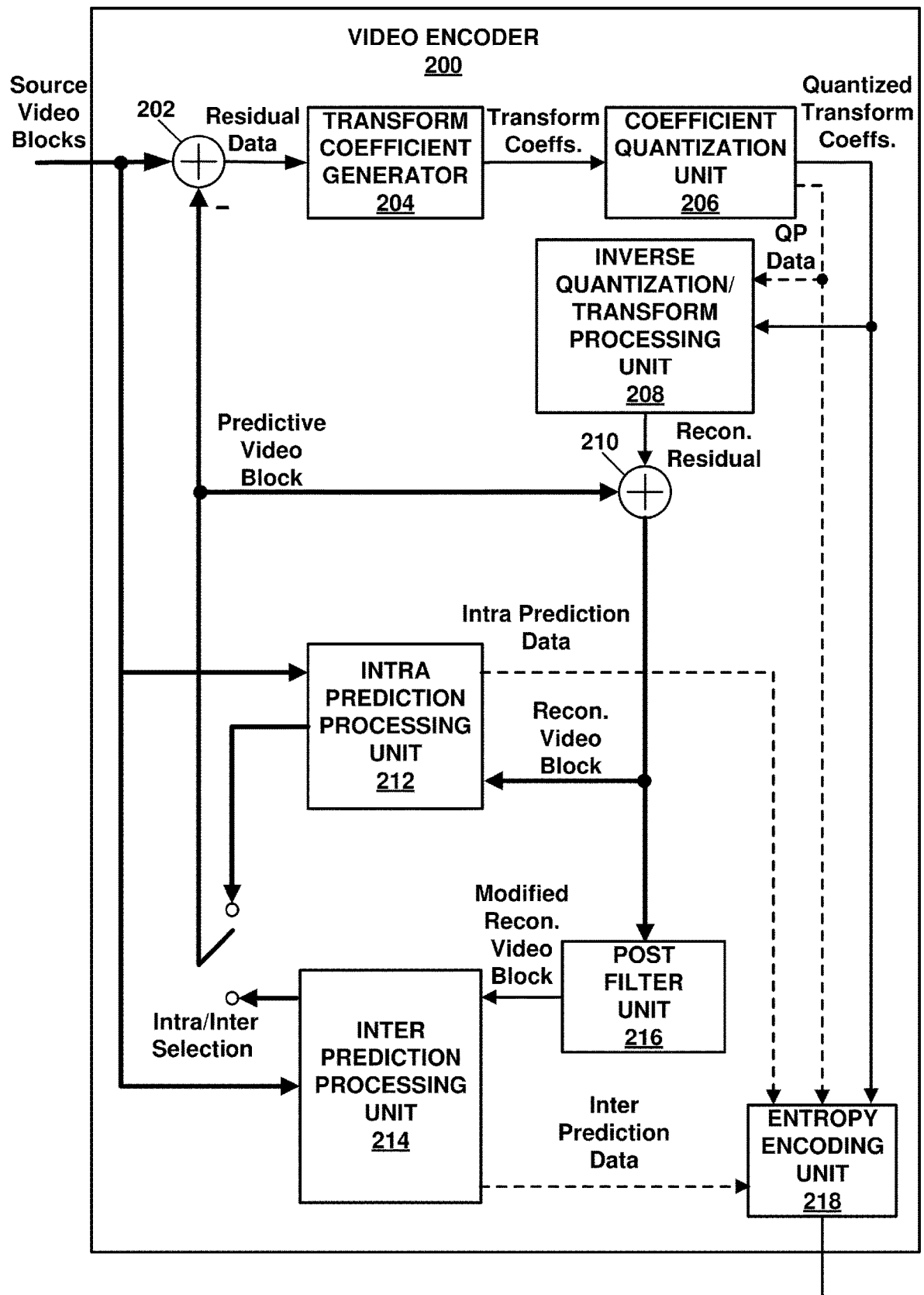
FIG. 2 is a block diagram illustrating an example of a video encoder that may be configured to encode video data according to one or more techniques of this disclosure.

FIG. 2 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 2, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder may be configured to perform additional sub-divisions of source video blocks. It should be noted that the techniques described herein are generally applicable to video coding, regardless of how source video data is partitioned prior to and/or during encoding. In the example illustrated in FIG. 2, video encoder 200 includes summer 202, transform coefficient generator 204, coefficient quantization unit 206, inverse quantization/transform processing unit 208, summer 210, intra prediction processing unit 212, inter prediction processing unit 214, post filter unit 216, and entropy encoding unit 218. As illustrated in FIG. 2, video encoder 200 receives source video blocks and outputs a bitstream.

In the example illustrated in FIG. 2, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. As further described above and illustrated with respect to FIG. 4, in JEM, luma and chroma components may have separate QTBT structures. As such, CBs of a luma component may not necessarily align with CBs of chroma components. Coefficient quantization unit 206 may be configured to determine respective QPs for each luma CB and each chroma CB included in a CTU and signal QP data according to one more techniques of this disclosure.

As described above, in ITU-T H.265, a quantization group size is used to determine if a delta QP value can be signaled for a particular TU. In a similar manner, a quantization group size, or the like, may be used to determine if a delta QP value can be signaled for a particular leaf node of a QTBT (i.e., a CB of a CTU). In one example, coefficient quantization unit 206 may be configured to determine a QP for CBs of a luma component in a CTU based on a luma quantization group size. FIGS. 5A-5D are conceptual diagrams illustrating examples of determining a QP for each CB of a luma component based on a luma quantization group size. As illustrated in FIGS. 5A-5D, the number of luma QPs for the CTB is based on the luma quantization group size. In one example, a predictive QP value may be determined for the CTB and a respective delta QP value (which may be signaled to a video decoder) may be used to determine each of the respective luma QP values illustrated in FIGS. 5A-5D. For example, in FIG. 5B respective delta QP values may be used to adjust a predictive QP to determine each of $QP_{Y0}$, $QP_{Y1}$, $QP_{Y2}$, and $QP_{Y3}$. In one example, coefficient quantization unit 206 may be configured to determine a QP for the corresponding chroma CBs in the CTU based on a chroma quantization group size. In one example, the chroma quantization group size may be dependent on the luma quantization group size. In one example, the chroma quantization group size may be independent of the luma quantization group size. That is, for example, QP values and/or quantization group sizes may be determined and/or signaled independently for luma and chroma components. For example, a luma quantization group size and chroma quantization group size may be different. Further, in one example, delta QPs for the luma and chroma partitions may be determined and/or signaled separately. It should be noted that in this example, this type of signaling may be enabled/disabled with a flag that is present at a CTU, a slice-level, a PPS, a sequence parameter set (SPS), etc.

As described above, JEM includes the following parameters for signaling of a QTBT tree: CTU size, MinQTSize, MaxBTSize, MaxBTDepth, and MinBTSize. Table 1 illustrates block sizes of QT leaf nodes at various QT depths for different CTU sizes (in the example, MinQTSize is 8). Further, Table 2 illustrates block sizes of BT leaf nodes at various BT depths for binary tree root node sizes (i.e., leaf quadtree node sizes).

TABLE 1

Block sizes of QT leaf nodes at various QT depth

|  |  | CTU size | | | | |
| --- | --- | --- | --- | --- | --- | --- |
|  |  | 256 × 256 | 128 × 128 | 64 × 64 | 32 × 32 | 16 × 16 |
| QT Depth | 0 | 256 × 256 | 128 × 128 | 64 × 64 | 32 × 32 | 16 × 16 |
|  | 1 | 128 × 128 | 64 × 64 | 32 × 32 | 16 × 16 | 8 × 8 |
|  | 2 | 64 × 64 | 32 × 32 | 16 × 16 | 8 × 8 |  |
|  | 3 | 32 × 32 | 16 × 16 | 8 × 8 |  |  |
|  | 4 | 16 × 16 | 8 × 8 |  |  |  |
|  | 5 | 8 × 8 |  |  |  |  |

TABLE 2

Block sizes of BT leaf nodes at various BT depth

|  |  | Block Size of QT leaf CB | | | | |
| --- | --- | --- | --- | --- | --- | --- |
|  |  | 128 × 128 | 64 × 64 | 32 × 32 | 16 × 16 | 8 × 8 |
| BT depth | 1 | 128 × 64 | 64 × 32 | 32 × 16 | 16 × 8 | 8 × 4 |
|  |  | 64 × 128 | 32 × 64 | 16 × 32 | 8 × 16 | 4 × 8 |
|  | 2 | 64 × 64 | 32 × 32 | 16 × 16 | 8 × 8 | 4 × 4 |
|  |  | 128 × 32 | 64 × 16 | 32 × 8 | 16 × 4 | 8 × 2 |
|  |  | 32 × 128 | 16 × 64 | 8 × 32 | 4 × 16 | 2 × 8 |
|  | 3 | 64 × 32 | 32 × 16 | 8 × 16 | 8 × 4 |  |
|  |  | 32 × 64 | 16 × 32 | 16 × 8 | 4 × 8 |  |
|  |  | 128 × 16 | 64 × 8 | 32 × 4 | 16 × 2 |  |
|  |  | 16 × 128 | 8 × 32 | 4 × 32 | 2 × 16 |  |

Thus, referring to Table 1, the quadtree node size may be determined based on CTU size and a QT Depth. If the quadtree is further split into binary tree, then binary tree leaf node size may be determined based on QT node size and BT depth. Each of MaxBTSize, MaxBTDepth, and MinBTSize may be used to determine a minimum allowed binary tree leaf node size. For example, if CTU size is 128×128, QT Depth is 3, MaxBTSize is 16×16, and MaxBTDepth is 2, the minimum allowed binary tree leaf node size includes 64 samples (i.e., 8×8, 16×4, or 4×16). In this case, if MaxBTDepth is 1, the minimum allowed binary tree leaf node size includes 128 samples (i.e., 16×8 or 8×16). Table 3 illustrates block sizes of BT leaf nodes at various combinations of QT depths and BT depths for a CTU size of 128×128.

TABLE 3

Block sizes of BT leaf nodes of a 128 × 128 CTU at various QT and BT depths

|  |  | QT Depth | | | | |
| --- | --- | --- | --- | --- | --- | --- |
|  |  | 0 | 1 | 2 | 3 | 4 |
| BT Depth | 0 | 128 × 128 | 64 × 64 | 32 × 32 | 16 × 16 | 8 × 8 |

TABLE 3-continued

Block sizes of BT leaf nodes of a 128 × 128 CTU at various QT and BT depths

|  |  | QT Depth | | | | |
| --- | --- | --- | --- | --- | --- | --- |
|  |  | 0 | 1 | 2 | 3 | 4 |
|  | 1 | 128 × 64 | 64 × 32 | 32 × 16 | 16 × 8 | 8 × 4 |
|  |  | 64 × 128 | 32 × 64 | 16 × 32 | 8 × 16 | 4 × 8 |
|  | 2 | 64 × 64 | 32 × 32 | 16 × 16 | 8 × 8 | 4 × 4 |
|  |  | 128 × 32 | 64 × 16 | 32 × 8 | 16 × 4 | 8 × 2 |
|  |  | 32 × 128 | 16 × 64 | 8 × 32 | 4 × 16 | 2 × 8 |
|  | 3 | 64 × 32 | 32 × 16 | 8 × 16 | 8 × 4 |  |
|  |  | 32 × 64 | 16 × 32 | 16 × 8 | 4 × 8 |  |
|  |  | 128 × 16 | 64 × 8 | 32 × 4 | 16 × 2 |  |
|  |  | 16 × 128 | 8 × 32 | 4 × 32 | 2 × 16 |  |

In one example, quantization group sizes may be based on the number of samples that may be included in an array of samples (e.g., a CB) of a CTB. As such, allowed quantization group sizes may be based on one or more of CTU size, QT Depth, BT Depth, MinQTSize, MaxBTSize, MaxBTDepth, and MinBTSize. Further, quantization group sizes may be based on maximum values defined for a CU height and a CU width (e.g., MaxCUHeight and MaxCUWidth). For example, allowed quantization group sizes may be constrained such that a quantization group size is equal to or larger than a minimum number of samples that may be included in a CB of a CTB. In one example, quantization group sizes may be constrained such that a quantization group size is smaller than or equal to number of samples that may be included in a CTB. It should be noted that in other examples, allowed quantization group sizes may be constrained in other manners (e.g., larger than a minimum number of samples that may be included in a CB of a CTB by a predetermined value, etc.).

In one example, allowed quantization group sizes for a CTU may be based on a function of QT depth and BT depth. In one example, allowed quantization group sizes for a CTU may be based on the sum of a QT depth and a BT depth being less than or equal to a predetermined value. It should be noted that the predetermined value may be signaled, inferred based on coding parameters and the like, and/or derived from past data (e.g., inherited from a previous CTU). For example, referring to Table 3, if the predetermined value is 1, allowed quantization group sizes for the 128×128 CTU in the example of Table 3 may include 128×128, 128×64, 64×128 or 64×64. That is, the sum of the following QT depth and BT depth combinations are less than or equal to 1: QT depth=0, BT depth=0; QT depth=0, BT depth=1; and QT depth=1, BT depth=0 and correspond to the following set of leaf node sizes: 128×128, 128×64, 64×128 or 64×64. In this case, the quantization group size for the 128×128 CTU may be signaled as one of the allowed quantization group sizes and/or as one of QT depth, BT depth or the combination of QT depth and BT depth. For example, in one example, one of 128×128, 128×64, 64×128 or 64×64 may be signaled at the CTU level. Further, in one example, CBs having a particular QT depth and BT depth combinations may form a quantization group, i.e., QP delta values may be signaled only for CBs satisfying particular QT depth and BT depth combinations. For example, in this case, QP delta values may be signaled for CBs having a sum of QT depth and BT depth less than or equal to 1. It should be noted that in this case, a similarly sized CB not satisfying a particular QT depth and BT depth combination would not form a quantization group. For example, referring to Table 3, if the condition is a sum of QT depth and BT depth less than or equal to 1, for 64×64 blocks having QT depth=1, BT depth=0, a delta QP value may be signaled and for 64×64 blocks having QT depth=0, BT depth=2, a delta QP value would not be signaled.

In one example, allowed quantization group sizes may be based on a number of samples being greater than or equal to a predetermined value. For example, referring to Table 3, if the predetermined value is 4096 samples, allowed quantization group sizes for the 128×128 CTU in the example of Table 3 may include 128×128, 128×64, 64×128, 64×64, 128×32, and 32×128. That is, the number of samples included in a CB for the following QT depth and BT depth combinations are greater than or equal to 4096: QT depth=0, BT depth=0; QT depth=0, BT depth=1; QT depth=1, BT depth=0; and QT depth=0, BT depth=2 and correspond to the following set of leaf node sizes: 128×128, 128×64, 64×128, 64×64, 128×32, or 32×128. In this case, the quantization group size for the 128×128 CTU may be signaled as one of the allowed quantization group sizes or as a number of samples (e.g., 8192 may be signaled to indicate that delta QPs are signaled for 128×64 and 64×128 CBs). It should be noted that the predetermined value for the number of samples may be signaled, inferred based on coding parameters and the like, and/or derived from past data (e.g., inherited from a previous CTU).

In one example, a video encoder may signal a value indicating a particular allowed quantization group size that is used for a CTU. In one example, a value may be signaled as divisor of CTU size, for e.g. when CTU size is $128^2$ and the smallest allowed quantization group size is $128^2$ divided by 16, then 16 (or log 2(16)) may be signaled, where log 2( ) is logarithm to the base 2. In one example, a value may be signaled as a difference value, for example, in a manner similar to signaling syntax element diff_cu_qp_delta_depth. In one example, the quantization group size may be signaled as number of samples included in the quantization group, as described above. In one example, the number of samples included in the quantization group may be signaled as a difference value. For example, for a 128×128 CTU, a quantization group size of 4096 samples may be signaled as 12288 (i.e., $128^2$–4096=12288). In one example, difference values may be signaled using logarithmic notation and the like. In one example, the quantization group size may be signaled as function of QT depth and BT depth. For example, signaling a value of 1 may be used to determine if the CB in a CTU can be used as a quantization group when sums of QT depths and BT depths less than or equal to 1. For example, for the 128×128 CTU in Table 3, for CBs with QT depth=0, BT depth=0; CBs with QT depth=0, BT depth=1; and CBs with QT depth=1, BT depth=0. In one example, a quantization group sizes for a luma component may be based on CTU size, QT Depth, BT depth, MinQTSize, MaxBTSize, MaxBTDepth, and MinBTSize. In this case, in one example, a quantization group size for chroma may be based on the quantization group size defined for luma. Further, in this case, in one example, a quantization group size for chroma may be determined independently of the quantization group size for luma. In one example, a flag may be used to signal whether a quantization group size for chroma is dependent or independent of a quantization group size for luma. A flag may be signaled at a sequence level, a picture level, and/or a CTU level. In a similar manner, a quantization group size for luma may be based on the quantization group size defined for chroma, In one example, a flag (e.g., a flag at any of the levels described above) may be used to signal whether a quantization group size for luma is dependent or independent of a quantization group size for chroma.

In one example, coefficient quantization unit 206 may be configured to determine a QP for CBs of a chroma component based on one or more QPs determined for CBs of the luma component. FIGS. 6A-6D are conceptual diagrams illustrating examples of luma component quantization parameters that may be available for determining chroma quantization parameters. It should be noted that in some examples, coefficient quantization unit 206 may be configured to determine a QP for CBs of a chroma component based on a chroma quantization group size and determine a QP for CBs of a luma component based on one or more QPs determined for CBs of a chroma component (i.e., with respect to FIGS. 6A-6D, the roles of luma and chroma may be reversed). It should be noted that in some examples, one or more flags may be signaled (e.g., at a slice level, PPS level, CTU level, etc.) to indicate whether chroma QPs are determined based on luma QPs or whether luma QPs are determined based on chroma QPs.

Further, it should be noted that in some examples, one or more flags may be signaled (e.g., at a slice level, PPS level, CTU level, and/or CB level) to indicate whether chroma QP values are determined based on luma QP values or whether chroma QP values are determined independently. Likewise, in some examples, one or more flags may be signaled (e.g., at a slice level, PPS level, CTU level, and/or CB level) to indicate whether luma QP values are determined based on chroma QP values or whether luma QP values are determined independently. In one example, a CTU level flag (or higher level flag, e.g., slice header or PPS flag) may indicate that determining chroma QP values based on luma QP values (or luma QPs based on chroma QPs) is supported for CBs within a CTB and a flag may be signaled for each CB to indicate if a QP dependency relationship exists for the particular CB (e.g., the flag indicates for a particular component CB that the value of QP is based on a QP value of another component). In one example, a CB level flag equal to 0 may indicate that a luma QP delta value and a chroma QP delta value are coded independently and a CB level flag equal to 1 may indicate that a chroma QP delta value is dependent on luma QP delta value. It should be noted that in the case where a chroma QP delta value is dependent on luma QP delta value, a relationship between a chroma predictive QP value and a luma predictive QP value may be defined. For example, a value may be derived from a luma predictive QP and the value may be used as an index in a look-up table (LUT) to derive a chroma predictive QP. In one example, a relationship between chroma QP data and luma QP data may be defined. In one example, a relationship between a chroma QP value and a luma predictive QP value may be defined. In one example, a relationship between a chroma predictive QP value and a luma QP value may be defined. Relationships may be in a form of LUTs, functions, or combinations thereof. It should be noted that in one example, chroma components Cb and Cr may share flags (e.g., both components may have QP values that depend on luma QP values or both components have QP values that are independent of luma QP values).

In one example, instead of signaling a CTU level flag (or higher level flag, e.g., slice header or PPS flag) to indicate that determining chroma QP values based on luma QP values (or luma QPs are based on chroma QPs) is allowed for CBs within a CTB, coding parameters may be used to determine if determining chroma QPs based on luma QPs is allowed for CBs within a CTB. For example, signaling a flag for each CB to indicate if a QP value dependency relationship exists for the particular CB may only be enabled for particular slice types (e.g., intra slice types) and/or particular intra prediction modes (e.g., enabled for cross-component prediction techniques (e.g., a cross-component Linear Model (LM)) or enable for non-cross-component prediction techniques).

In one example, coefficient quantization unit 206 may be configured to determine the chroma QP to be used for a chroma CB by using the QP value corresponding to a relative luma pixel. For example, coefficient quantization unit 206 may be configured to determine the chroma QP to be used for a chroma CB based on the QP value corresponding to the luma pixel collocated with the upper left pixel of the chroma CB. For example, referring to FIG. 6B, for each of the 14 chroma CBs one of $QP_{Y0}$, $QP_{Y1}$, $QP_{Y2}$, and $QP_{Y3}$ may be mapped to the upper left pixel of each of the CBs and QP for each chroma CB may be determined as a function of the mapped luma QP. In one example, the function may be similar to the function described above with respect to I-ITU H.265, i.e., a function of the mapped luma QP and chroma QP offsets signaled in a slice header and/or chroma QP offsets signaled PPS. In one example, the function may optionally or additionally include one or more chroma delta QPs corresponding to a chroma quantization group size. For example, a chroma quantization group size may be smaller, equal to, or larger than the luma quantization group size. For example, referring to FIG. 6B, each chroma CB may be associated with a delta QP value, one delta QP may be defined for the chroma CTB, four delta QPs may be defined for the chroma CTB, or 14 delta QPs may be defined for the chroma CTB, etc. It should be noted that in this example, collocation may account for a change in resolution, as the chroma data may be stored at a reduced resolution compared to the luma.

In one example, coefficient quantization unit 206 may be configured to determine the chroma QP to be used for a chroma CB based on an average of corresponding luma QP values. For example, referring to FIG. 6D, for the lower right chroma CB (i.e., the vertical rectangle) the QP may be the average of $QP_{Y11}$, $QP_{Y12}$, $QP_{Y13}$, $QP_{Y14}$, and $QP_{Y16}$. It should be noted that in other examples, other statistical functions may be used, for example, the minimum, the maximum, the median, etc. Further, it should be noted that once an average (or other statistic) is determined, the QP for the CB may be based on function similar to the functions described above. That is, for example, the QP determined from a statistic may be entered into a function including chroma QP offsets signaled in a slice header and/or chroma QP offsets signaled PPS or a QP determined from a statistic may be adjusted by one or more chroma delta QPs corresponding to a chroma quantization group size.

In one example, when a leaf of a luma partition is larger than the quantization group size, (this case is illustrated with respect to $QP_{Y6}$ in FIG. 6C) signaling of multiple chroma delta QP values may be used to determine the QPs for the collocated chroma CBs. In one example, the signaling may include the following: signal a flag if a delta QP data is present, signal the first delta QP value, signal a flag if additional delta QP values are present; signal a number of additional delta QP values that are present; and signal each additional delta QP values. For example, referring to FIG. 6C for $QP_{Y6}$, zero to three (i.e., there are 3 collocated chroma CBs for $QP_{Y6}$) delta chroma QPs may be signaled. In one example, the number of delta QP values may be dependent on the size of the current luma CB and/or the luma quantization group size, and/or a chroma quantization group size.

As described above, in ITU-T H.265, the signaling of a delta QP value is conditioned on one of cbf_luma, cbf_cb, or cbf_cr indicating one or more transform coefficient levels for a component are significant. In one example, according to the techniques described herein, luma delta QP values may be signaled when a luma coding block flag indicates significant coefficients, and chroma delta QP values may be signalled when at least one of a chroma Cb coding block flag and a chroma Cr coding block flag respectively indicate significant coefficients. Further, in one example, according to the techniques described herein, luma delta QP values may be signaled when a luma coding block flag indicates significant coefficients, and chroma delta QP values may be signaled when luma QP and chroma QP are signaled independently (e.g., based on a flag or coding parameters indicating that determining chroma QPs based on luma QPs is allowed for CBs within a CTB, as described above).

It should be noted that in other examples, one or more addition or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 2, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 2, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 2, intra prediction processing unit 212 outputs intra prediction data (e.g., syntax elements) to entropy encoding unit 220 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 2). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 2, inter prediction processing unit 214 may receive reconstructed video block via post filter unit 216. Post filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 2, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 7:
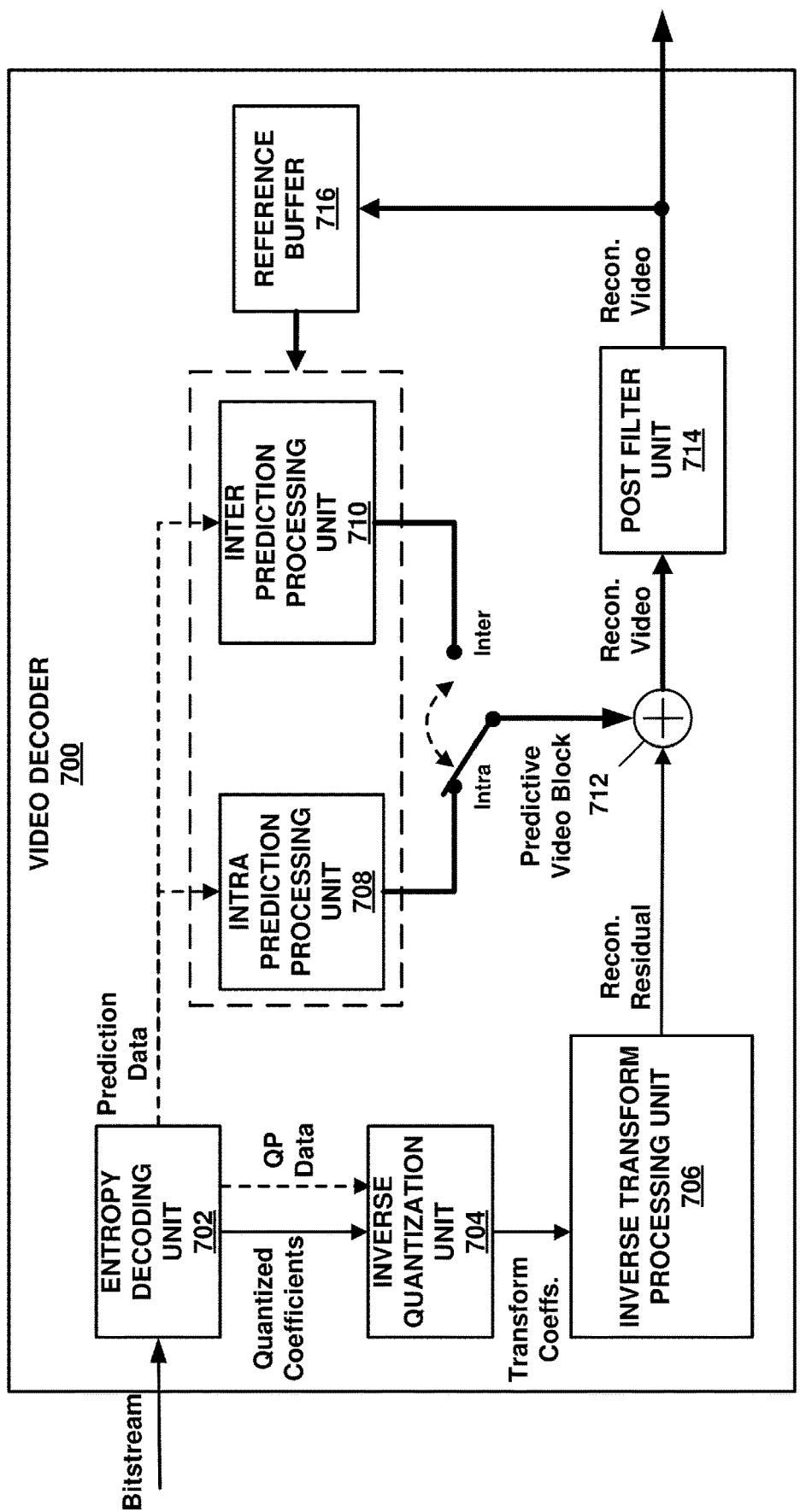
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 700 may be configured to determine a quantization parameter for a CB based on one or more of the techniques described above. Video decoder 700 may be configured to perform intra prediction decoding and inter prediction decoding and, as such, may be referred to as a hybrid decoder. In the example illustrated in FIG. 7 video decoder 700 includes an entropy decoding unit 702, inverse quantization unit 704, inverse transformation processing unit 706, intra prediction processing unit 708, inter prediction processing unit 710, summer 712, post filter unit 714, and reference buffer 716. Video decoder 700 may be configured to decode video data in a manner consistent with a video encoding system, which may implement one or more aspects of a video coding standard. It should be noted that although example video decoder 700 is illustrated as having distinct functional blocks, such an illustration is for descriptive purposes and does not limit video decoder 700 and/or sub-components thereof to a particular hardware or software architecture. Functions of video decoder 700 may be realized using any combination of hardware, firmware, and/or software implementations.

As illustrated in FIG. 7, entropy decoding unit 702 receives an entropy encoded bitstream. Entropy decoding unit 702 may be configured to decode quantized syntax elements and quantized coefficients from the bitstream according to a process reciprocal to an entropy encoding process. Entropy decoding unit 702 may be configured to perform entropy decoding according any of the entropy coding techniques described above. Entropy decoding unit 702 may parse an encoded bitstream in a manner consistent with a video coding standard.

Referring again to FIG. 7, inverse quantization unit 704 receives quantized transform coefficients (i.e., level values) and quantization parameter data from entropy decoding unit 702. Quantization parameter data may include any and all combinations of delta QP values and/or quantization group size values and the like described above. Video decoder 700 and/or inverse quantization unit 704 may be configured to determine QP values used for inverse quantization based on values signaled by a video encoder and/or through video properties and/or coding parameters. That is, inverse quantization unit 704 may operate in a reciprocal manner to coefficient quantization unit 206 described above. For example, inverse quantization unit 704 may be configured to infer predetermined values (e.g., determine a sum of QT depth and BT depth based on coding parameters), allowed quantization group sizes, and the like, according to the techniques described above. Inverse quantization unit 704 may be configured to apply an inverse quantization. Inverse transform processing unit 706 may be configured to perform an inverse transformation to generate reconstructed residual data. The techniques respectively performed by inverse quantization unit 704 and inverse transform processing unit 706 may be similar to techniques performed by inverse quantization/transform processing unit 208 described above. Inverse transform processing unit 706 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether particular transform (or type of particular transform) is performed may be dependent on an intra prediction mode. As illustrated in FIG. 7, reconstructed residual data may be provided to summer 712. Summer 712 may add reconstructed residual data to a predictive video block and generate reconstructed video data. A predictive video block may be determined according to a predictive video technique (i.e., intra prediction and inter frame prediction). In one example, video decoder 700 and the post filter unit 714 may be configured to determine QP values and use them for post filtering (e.g., deblocking). In one example, other functional blocks of the video decoder 700 which make use of QP may determine QP based on received signaling and use that for decoding.

Intra prediction processing unit 708 may be configured to receive intra prediction syntax elements and retrieve a predictive video block from reference buffer 716. Reference buffer 716 may include a memory device configured to store one or more frames of video data. Intra prediction syntax elements may identify an intra prediction mode, such as the intra prediction modes described above. In one example, intra prediction processing unit 708 may reconstruct a video block using according to one or more of the intra prediction coding techniques describe herein. Inter prediction processing unit 710 may receive inter prediction syntax elements and generate motion vectors to identify a prediction block in one or more reference frames stored in reference buffer 716. Inter prediction processing unit 710 may produce motion compensated blocks, possibly performing interpolation based on interpolation filters. Identifiers for interpolation filters to be used for motion estimation with sub-pixel precision may be included in the syntax elements. Inter prediction processing unit 710 may use interpolation filters to calculate interpolated values for sub-integer pixels of a reference block. Post filter unit 714 may be configured to perform filtering on reconstructed video data. For example, post filter unit 714 may be configured to perform deblocking and/or SAO filtering, as described above with respect to post filter unit 216. Further, it should be noted that in some examples, post filter unit 714 may be configured to perform proprietary discretionary filter (e.g., visual enhancements). As illustrated in FIG. 7, a reconstructed video block may be output by video decoder 700. In this manner, video decoder 700 may be configured to generate reconstructed video data according to one or more of the techniques described herein. In this manner video decoder 700 may be configured to receive level values corresponding to a chroma coding block, wherein the chroma coding block, is independent of a luma component partition structure, determine quantization parameter for the chroma coding block, and generate transform coefficient values based on the determined quantization parameter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

In one example, a method of encoding video data, comprises receiving transform coefficients corresponding to a chroma coding block, wherein the chroma coding block is independent of a luma component partition structure, determining quantization parameter for the chroma coding block, and generating level values based on the determined quantization parameter.

In one example, a device for video encoding comprises one or more processors configured to receive transform coefficients corresponding to a chroma coding block, wherein the chroma coding block is independent of a luma component partition structure, determine quantization parameter for the chroma coding block, and generate level values based on the determined quantization parameter.

In one example, a non-transitory computer-readable storage medium comprises instructions stored thereon that, when executed, cause one or more processors of a device to receive transform coefficients corresponding to a chroma coding block, wherein the chroma coding block is independent of a luma component partition structure, determine quantization parameter for the chroma coding block, and generate level values based on the determined quantization parameter.

In one example, an apparatus comprises means for receiving transform coefficients corresponding to a chroma coding block, wherein the chroma coding block is independent of a luma component partition structure, means for determining quantization parameter for the chroma coding block, and means for generating level values based on the determined quantization parameter.

In one example, a method of decoding video data, comprises receiving level values corresponding to a chroma coding block, wherein the chroma coding block is independent of a luma component partition structure, determining quantization parameter for the chroma coding block, and generating transform coefficients based on the determined quantization parameter.

In one example, a device for video decoding comprises one or more processors configured to receive level values corresponding to a chroma coding block, wherein the chroma coding block is independent of a luma component partition structure, determine quantization parameter for the chroma coding block, and generate transform coefficients based on the determined quantization parameter.

In one example, a non-transitory computer-readable storage medium comprises instructions stored thereon that, when executed, cause one or more processors of a device to receive level values corresponding to a chroma coding block, wherein the chroma coding block is independent of a luma component partition structure, determine quantization parameter for the chroma coding block, and generate transform coefficients based on the determined quantization parameter.

In one example, an apparatus comprises means for receiving level values corresponding to a chroma coding block, wherein the chroma coding block is independent of a luma component partition structure, means for determining quantization parameter for the chroma coding block, and means for generating transform coefficients based on the determined quantization parameter.

The details of one or more examples are set forth in the accompanying drawings and the description below. Other features, objects, and advantages will be apparent from the description and drawings, and from the claims.

The invention claimed is:

1. A method of decoding video data, the method comprising:
   receiving level values corresponding to a chroma coding block, wherein the chroma coding block is a block resulting from a partitioning for a chroma coding tree block, wherein the chroma coding tree block and a corresponding luma coding tree block form a coding tree unit, wherein the corresponding luma coding tree is partitioned into luma coding blocks and the luma coding blocks are organized into quantization groups such that a plurality of luma quantization parameters are determined for the luma coding tree block, wherein the chroma coding block is misaligned with the luma coding tree block;
   determining which of the plurality of luma quantization parameters is mapped to the chroma coding block;
   deriving a predictive chroma quantization parameter for the chroma coding block by using a value derived from the luma quantization parameter as an index in a look-up table;
   determining a quantization parameter for the chroma coding block by adding a delta quantization parameter associated with the chroma coding block to the predictive chroma quantization parameter; and
   generating transform coefficient values based on the determined quantization parameter for the chroma coding block.

2. A non-transitory computer-readable storage medium comprising instructions stored thereon that, when executed, cause one or more processors of a device for decoding video data to perform any and all combinations of the steps of claim 1.

* * * * *